(No Model.)  7 Sheets—Sheet 1.

F. H. RICHARDS.
WEIGHING MACHINE.

No. 559,210.  Patented Apr. 28, 1896.

Witnesses:  
R. W. Pittman  
Fred. J. Dole.

Inventor:  
F. H. Richards (No Model.) 7 Sheets—Sheet 3.

F. H. RICHARDS.
WEIGHING MACHINE.

No. 559,210. Patented Apr. 28, 1896.

Witnesses:
R. W. Pittman
Fred. J. Dole.

Inventor:
F. H. Richards (No Model.)  F. H. RICHARDS.  7 Sheets—Sheet 4.
WEIGHING MACHINE.

No. 559,210.  Patented Apr. 28, 1896.

Witnesses:
R. W. Pittman
Fred. J. Dole.

Inventor:
F. H. Richards

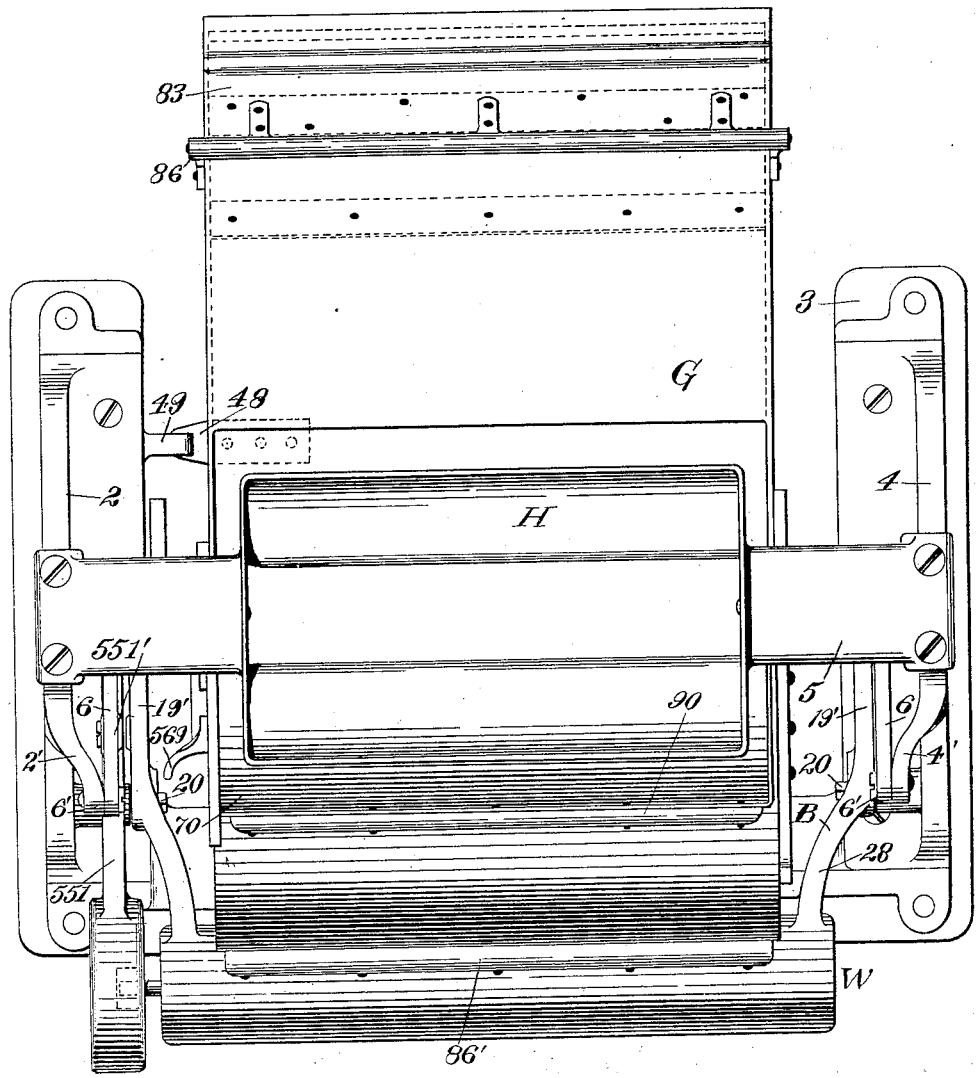

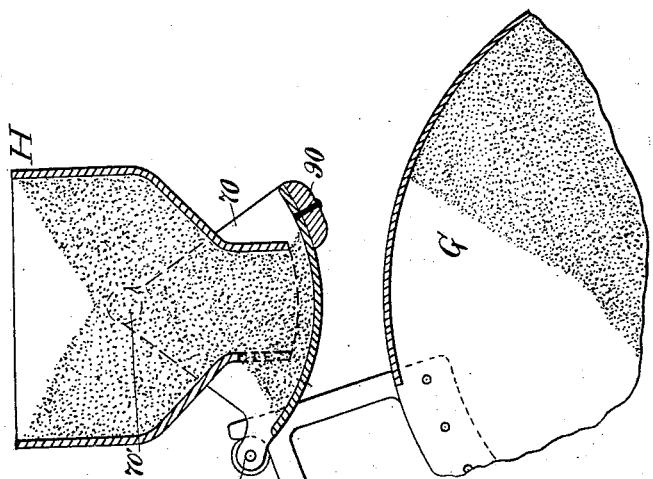
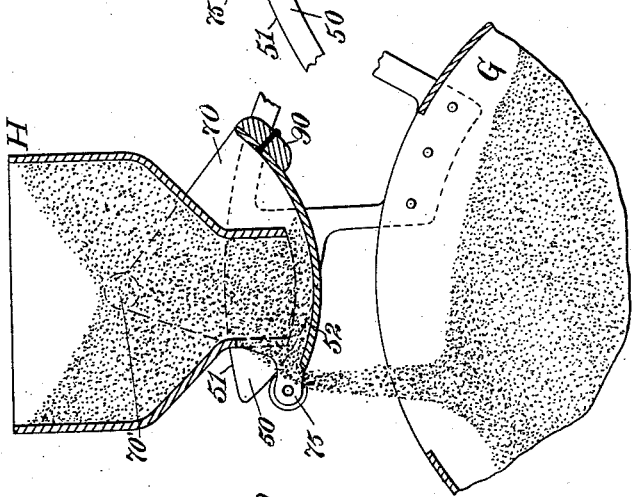
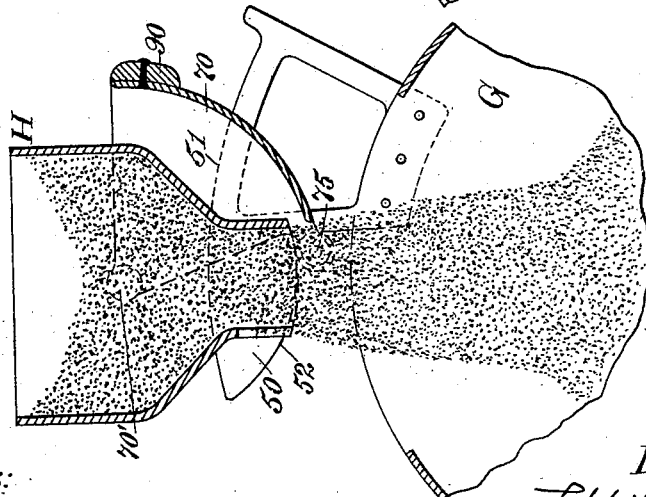

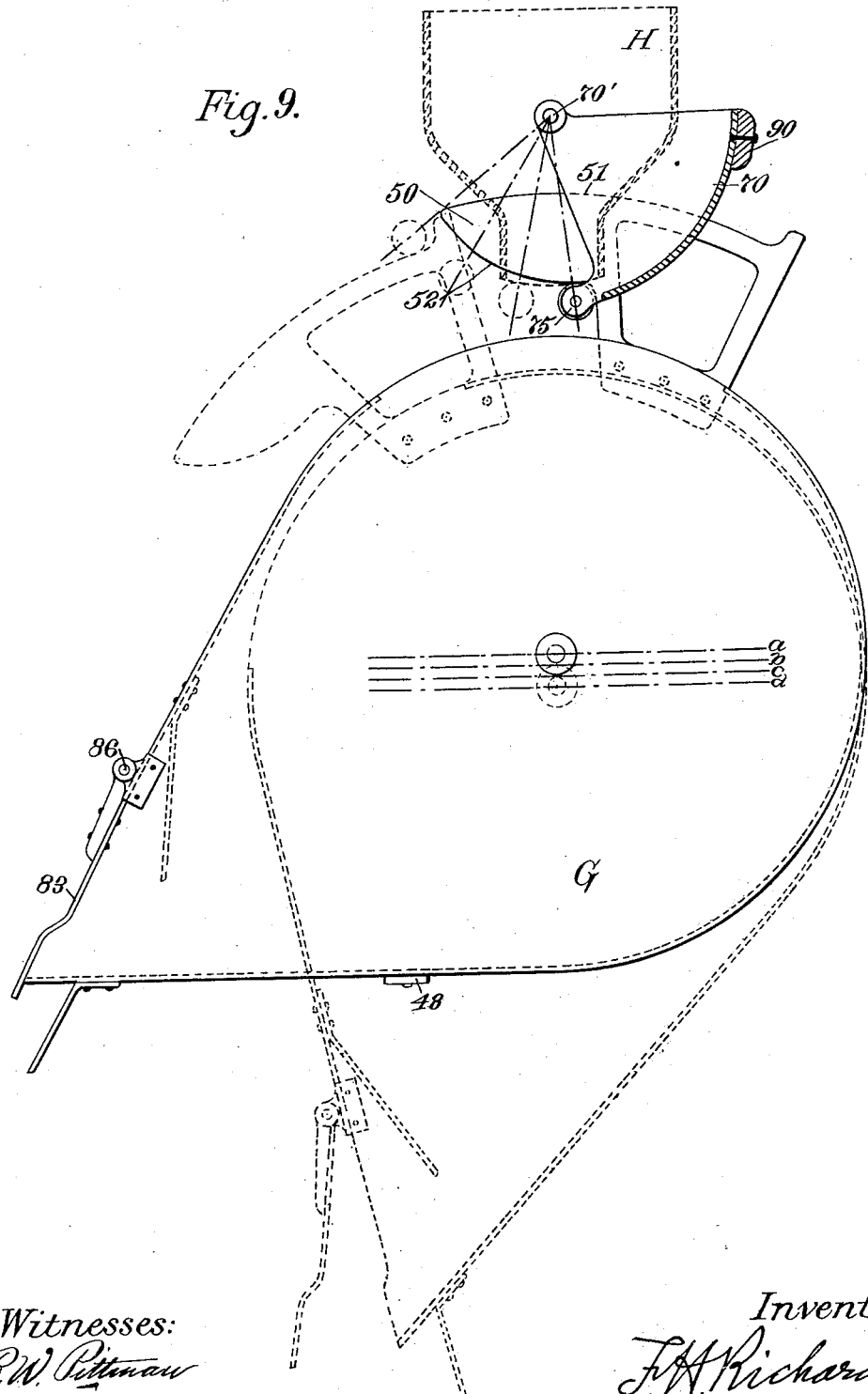

UNITED STATES PATENT OFFICE.

FRANCIS H. RICHARDS, OF HARTFORD, CONNECTICUT.

WEIGHING-MACHINE.

SPECIFICATION forming part of Letters Patent No. 559,210, dated April 28, 1896.

Application filed July 8, 1895. Serial No. 555,297. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and particularly to the single-chambered oscillatory-bucket type of weighing-machines, the object being to provide an organization of safety stop and limiting devices positioned for reciprocally limiting and regulating the valve and bucket movements, preventing premature operation of either the valve or the bucket, thereby insuring that nicety and exactness of operation which is necessary in any successful weighing-machine.

Figure 1:
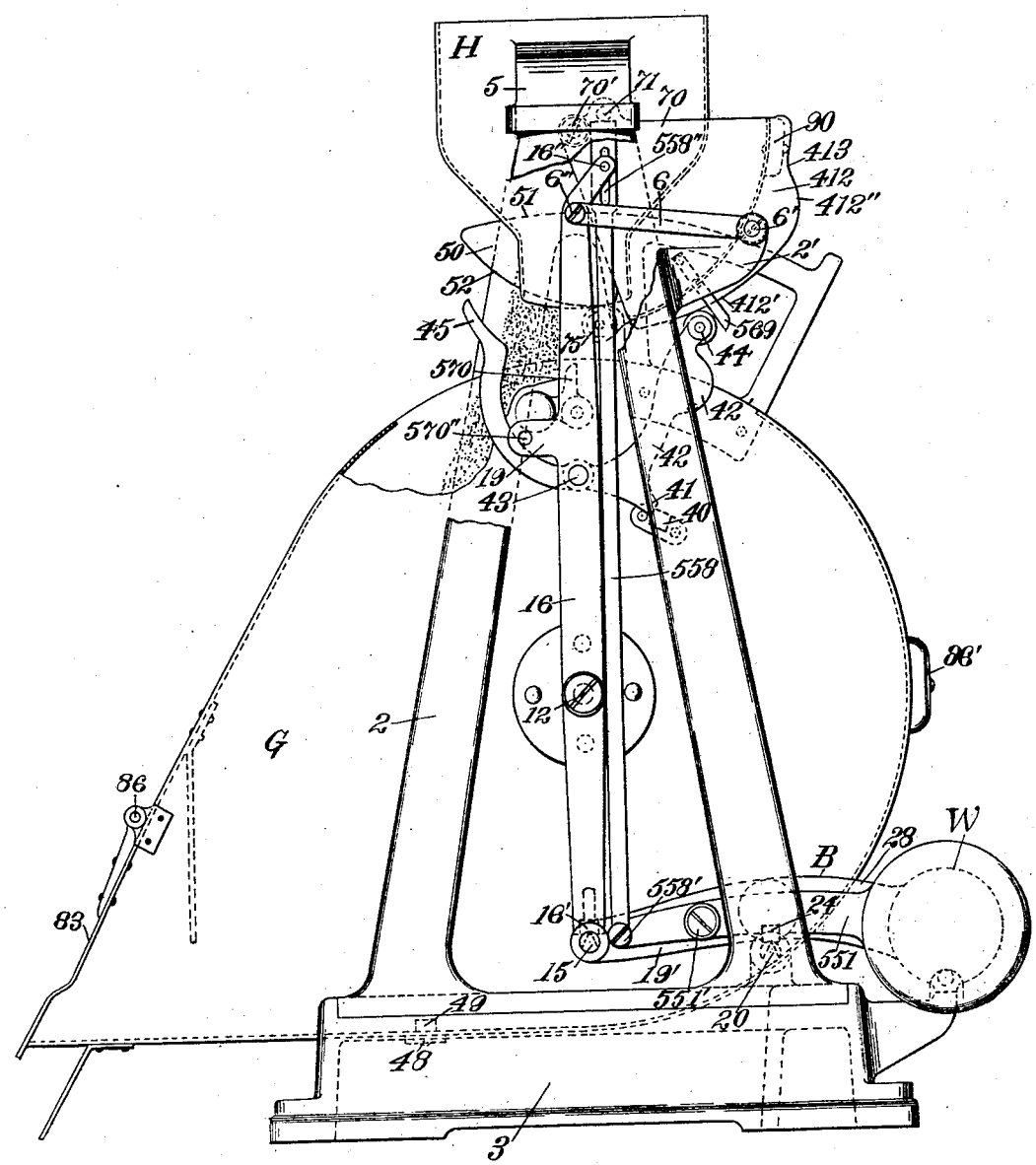
Figure 2:
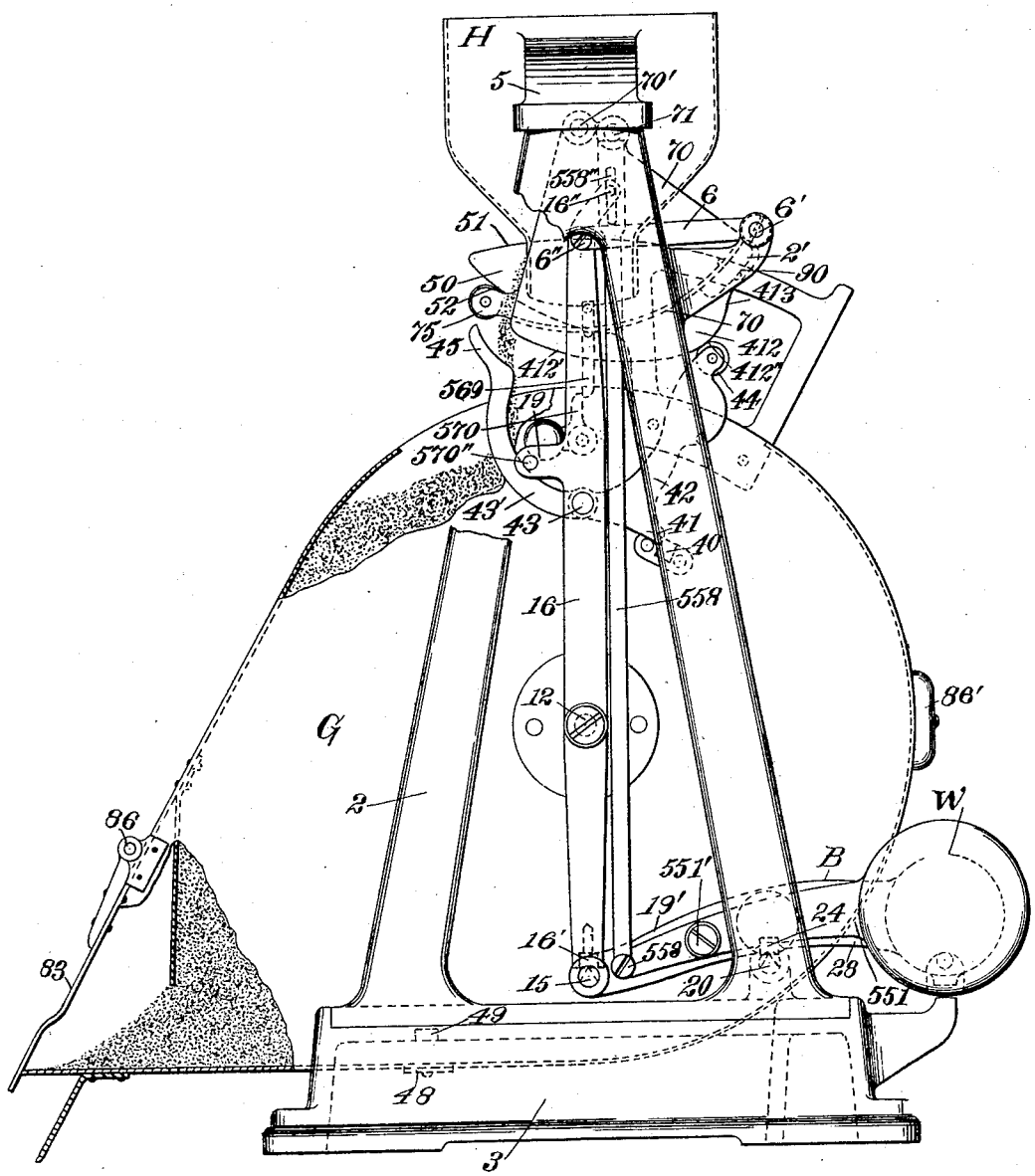
Figure 3:
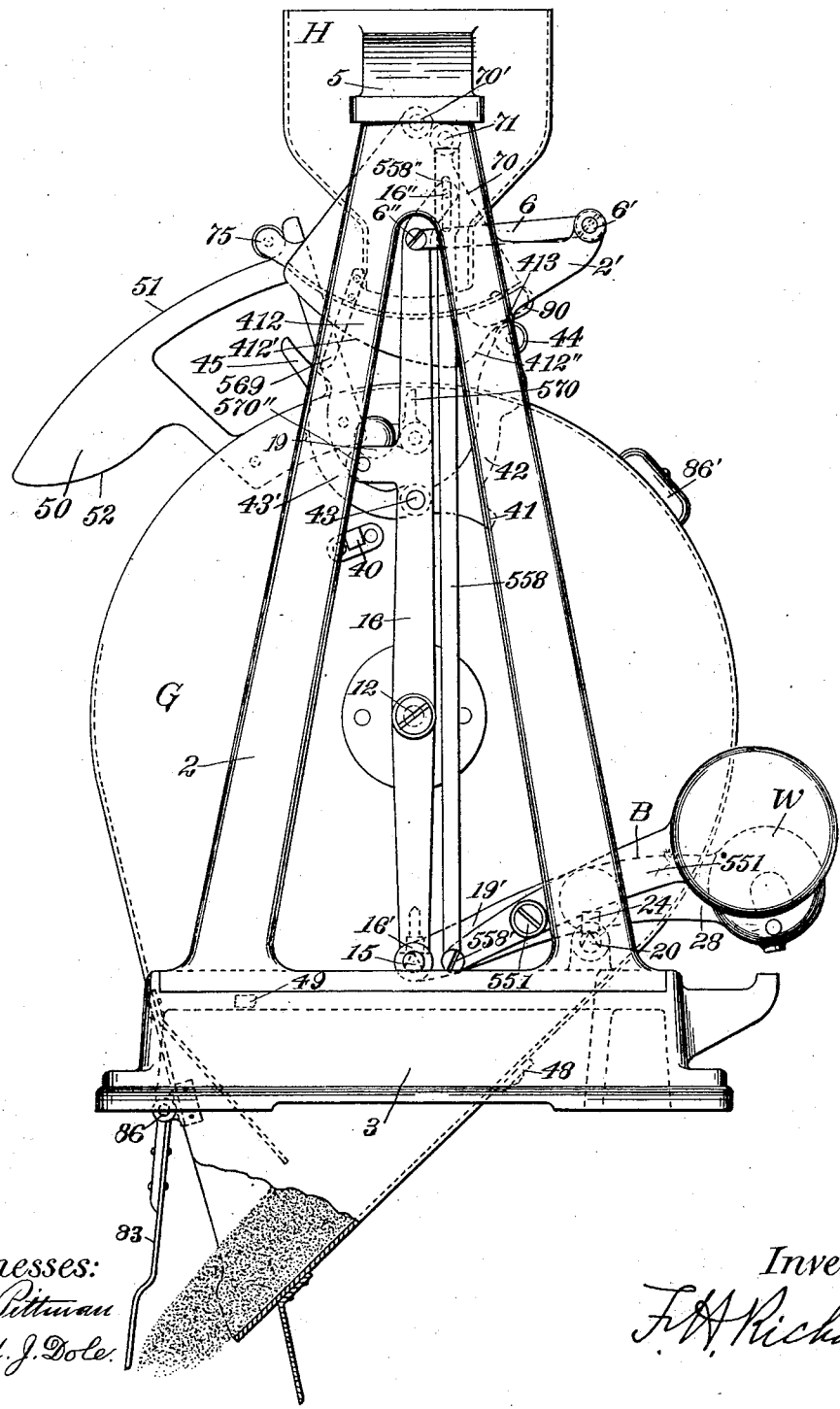
Figure 4:
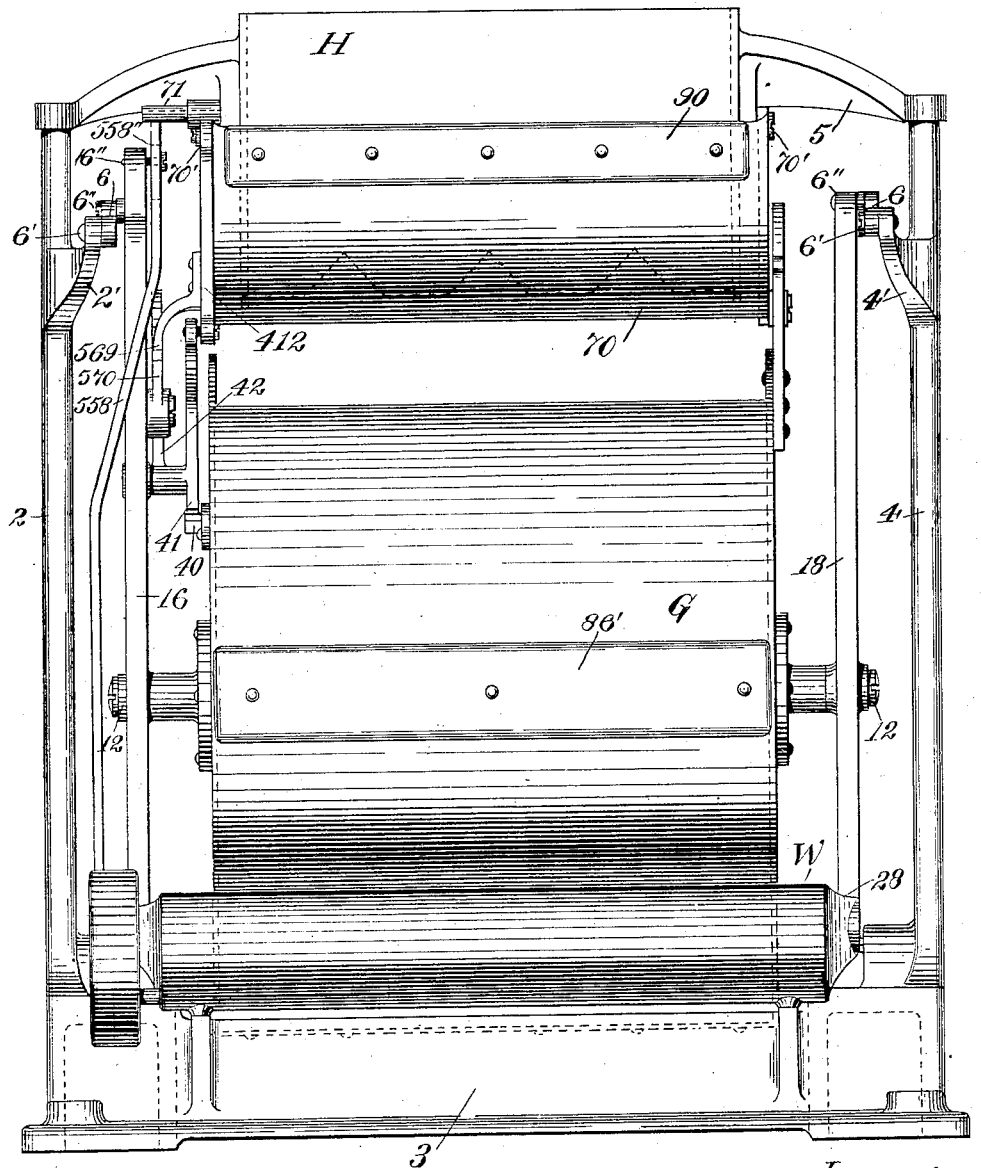

In the drawings accompanying and forming part of this specification, Figure 1 is a left-hand end elevation of a weighing-machine of the single-chambered oscillatory-bucket type, embodying my present improvements and showing the valve in a position for permitting the full stream to flow into the bucket. Fig. 2 is a similar view of the machine, showing the valve as having considerably reduced the volume of the stream, or to a drip-stream. Fig. 3 is a similar view showing the valve as having wholly cut off the stream and the bucket as having oscillated and as discharging the load. Fig. 4 is a rear elevation showing the various parts in substantially the same positions in which these are shown in Fig. 1. Fig. 5 is a plan view of the same. Figs. 6, 7, and 8 are enlarged details of certain portions of the machine, showing the valve and the bucket in positions corresponding, respectively, with Figs. 1, 2, and 3. Fig. 9 is a diagrammatic left-hand end elevation illustrating in full and dotted lines the bucket and the valve movements, successively, during the flow of the supply-stream and the making up and the discharge of the load, and also shows the limits of the bucket.

Similar characters designate like parts in all the figures of the drawings.

For convenience in illustrating the present improvements these are shown applied to the improved weighing-machine described and claimed in Letters Patent No. 465,535, granted to me December 22, 1891, and the machine so shown operates in the usual manner. The framework for carrying the operative parts of the machine, and as shown in the drawings, comprises two side frames or uprights 2 and 4, set on a chambered supporting-base 3, which may be secured thereto in any suitable manner. The side frames 2 and 4 are shown connected by a top plate or beam, as 5. The top plate or beam 5 is illustrated as carrying a supply-chute, such as H.

The bucket G is of the single-chambered type or class and is suspended for oscillatory movement and positioned with its receiving end or mouth for receiving the supply-stream from the supply-chute and is adapted for discharging the loads of grain intermittently.

The base 3 is shown as carrying some suitable beam-supports—such as the knife-edges 20, one on each side of the base—which are adapted for supporting the scale-beam which carries the bucket mechanism, consisting of the bucket and its operative devices.

The bucket G is shown at 12 as journaled in bearings formed in the hangers 16 and 18. As a means for supporting these hangers, and consequently the bucket, a scale-beam is shown at B as pivotally mounted on the beam-supports 20—as, for instance, by means of a pair of V-shaped bearings 24, carried by the beam-arms. The beam-arms of the scale-beams are shown provided near one end with supports for the hangers and the bucket, these supports being shown as the knife-edges 15, which are adapted to support the V-shaped bearings 16' of the hangers 16 and 18.

The scale-beam B is shown in the drawings as having a pair of beam-arms joined by a combined connecting-shaft and counterpoise, (designated by W.) The scale-beam B, as is usual, has bucket-poising and bucket-counterpoising portions. The bucket-counterpoising portion of the scale-beam B is designated by 28 and the bucket-poising portion of said scale-beam by 19'. Hence it will be evident that all those portions of the bucket mechanism and the beam mechanism inside of the beam-support 20 constitute the bucket-poising portion of the beam mechanism, and all that part of the beam mechanism outside of said beam-support 20 constitutes the bucket-counterpoising portion of the beam mechanism.

Means are shown in the drawings for limiting the lateral movement of the hangers 16 and 18 during the operation of the machine. The side frames 2 and 4 are each shown as having formed thereon laterally-extending arms 2' and 4'. Links 6 are shown pivotally connected at 6' and 6", respectively, with the arms 2' and 4' and the hangers 16 and 18. It will be obvious that by these connections free vertical movement of both the hangers will be permitted, but that lateral movement of said hangers will be prevented.

As a means for controlling the supply-stream from the supply-chute I prefer to employ a valve substantially similar to the improved valve described and claimed in Letters Patent No. 535,727, granted to me March 12, 1895. Such a valve is shown at 70 as pivoted at 70' to the supply-chute H for oscillatory movement. The valve is also illustrated as located substantially beneath the mouth of the supply-chute and as extending beyond the forward edge of the supply-chute sufficiently far to support the descending column or stream when the valve is closed. This valve is also preferably balanced so as to have, normally, in itself no tendency when closed to move in a direction laterally to its normally-closed position. As a means for actuating the valve to close the same any suitable actuator may be employed. The valve-closing actuator shown comprises a counterweight 90, which may be secured to the valve in some well-known manner, such as by riveting to the valve.

A connecting-rod is illustrated as constituting in part the means for transmitting to the valve the valve-opening movement of a valve-actuator, and that valve-actuator, which has for its function the operation of opening the valve, is shown as pivotally supported by the scale-beam B. In the form thereof herein illustrated this valve-opening actuator consists of a lever 551, pivoted at 551' to the scale-beam B and counterweighted at its rear end. The actuator 551, which constitutes a supplemental counterpoise or supplemental balancing means, normally forms a part of the bucket-counterpoising portion of the scale-beam B and is automatically shiftable onto the bucket-poising mechanism.

It will be noticed that the pivot 551' of the actuator is shown located inside of the bucket-supports, so that any downward pressure exerted upon the inner end of the actuating-lever 551 relatively to the bucket will oscillate the supplemental counterpoise 551, and that a very slight oscillatory movement will shift the same from the counterpoising portion to the poising portion of the scale-beam B. As the said supplemental balancing means is returning to its normal position, or to the counterpoising portion of the beam mechanism, it is adapted for transmitting to the connecting-rod 558 the valve-opening power necessary to open the valve.

The connecting-rod 558 is shown pivoted at 558' to the valve-opening actuator 551. The free end of the connecting-rod is shown in position and adapted for imparting to an arm or other suitable device 71, carried by the valve 70, the valve-opening movement of the valve-opening actuator 551.

For maintaining the connecting-rod 558 in operative position relatively to the valve some suitable guiding means will be employed, and the connecting-rod is shown having a longitudinal slot 558', through which passes a pin 16", carried by the hanger 16. It will be obvious that this construction will permit perfectly free vertical movement of the connecting-rod for actuating the valve; but lateral or swaying movement of said connecting-rod will be positively prevented.

My improved weighing-machine embodies, in connection with bucket mechanism embodying a bucket oscillatory for discharging the load, means for supplying a stream of material to the bucket, a valve for controlling said stream and valve-actuating mechanism, and a reciprocally-effective valve and bucket movement limiter operative for limiting the oscillation of the bucket by the non-closing of the valve and the opening movement of the valve by the non-oscillation of the bucket. Hence it will be apparent that a reciprocally-effective valve and bucket movement limiter is employed for limiting the valve and the bucket movements, and in practice said limiting means has demonstrated marked efficiency for preventing premature movement of either the valve or the bucket, consequently enhancing the value of the machine as a precise and accurate weighing factor. The oscillation of the bucket will be positively prevented during the flow of the supply-stream into the bucket, and said bucket will not oscillate for discharging the contents of the bucket until the completion of the bucket-load, nor will the bucket return to a stream-receiving position until the discharge of the load, and during this discharge period the limiter will effectively limit the opening movement of the valve.

The reciprocal valve-movement and bucket-movement limiter is shown at 42 and is in the nature of a latch. This latch or limiter is shown pivoted at 43 to the hanger 16 for oscillatory movement. For locking the bucket in a stream-receiving position (see Fig. 1) suitable detent mechanism will be employed. The latch 42 is shown provided with a detent or catch 41, adapted for engagement with a coöperating catch or detent 40, carried by the bucket, and during the engagement of these detents the bucket cannot oscillate in a forward or bucket-discharging direction. Some suitable means will be employed for limiting the rearward movement of the bucket when this is brought to a stream-receiving position. The bucket G is shown as having a stop-arm 48, and the base 3 as having a coöperating stop-arm disposed in the path of movement of the stop-arm 48 of the bucket. These stop-arms are so positioned, each relatively to the other, that when the bucket returns for receiving the stream the stop-arm 48 of the bucket will impinge against the stop-arm 49 on the base, thereby preventing rearward movement of the bucket while this is in a stream-receiving position.

The valve 70 is shown provided with a stop constituting a main stop 412, which may be carried by and oscillatory with the valve. This stop 412 is shown provided with three faces (shown as stop-faces or cam-faces 412' and 412'', respectively) and a locking-stop 413, the peculiar functions of which will be hereinafter specified. The limiter or latch 42 is shown as having a locking-stop 44, which is adapted to coöperate at all times with one or the other of the faces of the main stop 412. The stop 44 is preferably in the form of a friction-wheel, which serves its well-known function. The stop 44 of the limiter or latch, as stated, will be in engagement throughout the operation of the machine with one or the other faces of the main stop 412. During the closure of the valve 70 said stop will be in coöperative relation with the cam-faces 412' and 412'', and when said valve is closed the stop 44 is adapted to be thrown into locked engagement with locking-stop 413.

Means are provided for controlling the duration of the drip-stream just prior to the oscillation of the bucket for discharging the load. The valve 70 is shown provided with a depending stop-arm or detent 569, oscillatory with the valve and in position and adapted to be engaged by a stop on the hanger at a predetermined point in the descent of the bucket and the closure of the valve. This stop is shown at 570 as pivotally carried by the hanger 16 and as having its upper end adapted to swing freely toward the rear and as having its forward movement limited by means of a stop 570'', carried on the laterally-extended arm 19 of the hanger 16.

The length of the upper arm of the by-pass stop 570 relatively to the arm 569 is such that when the valve is stopped during its closing movement and at the beginning of the drip period the by-pass stop is adapted for releasing the arm 569, when the valve will be closed quickly by means of the valve-closing actuator. The by-pass limiting-stop 570'' also serves as a means for limiting the upward movement of the arm 43' of the limiter 42.

The arm or detent 569 is shown as constituting in part the means for shifting the latch or limiter-catch 41 out of engagement with the bucket-catch 40 at the proper period, thereby permitting an oscillation of the loaded bucket for discharging the load. From this it will be evident that the detent 569 also constitutes in part means or an actuator for shifting the latch out of operative relation with the bucket for permitting the discharge of the load and into operative relation with the valve for preventing reverse or valve-opening movement.

The latch or limiter 42 is shown provided with a curved or crank portion 45, which is adapted to be engaged by the arm or actuator 569 at a point immediately succeeding the release of said arm by the by-pass 570. It will be obvious that when said crank or curved portion 45 of the latch or limiter 42 is so engaged the latter will be tripped, thereby releasing the limiter-detent 41 from engagement with the detent 40 of the bucket G. When these detents 41 and 40 are disengaged, the bucket will then be free to oscillate for discharging the bucket-load. At a point just prior to the release of the arm 569 by the by-pass 570 the stop 44 will be very near the end of the cam or limiting face 412'', and it will be appprent that when the latch or limiter 42 is tripped in the manner just described, the valve-closing movement having been limited by the contact of the stop 44 with the limiting-face 412'', the valve will then be free of restraint and will be closed quickly by the valve-closing actuator 90, and the arm 569 will be effective for instantly thrusting the stop 44 into locked engagement with the locking-stop 413, thereby preventing reverse or opening movement of the valve, and these stops 44 and 413 will be maintained in locked engagement so long as the arm 569 is in contact with the curved or crank portion 45 of the latch or limiter 42.

During the descent of the bucket the bucket carries therewith the latch or limiter 42, the stop 44 of which, when the bucket is in its uppermost or highest position and the full stream is flowing into the bucket, is in operative engagement with the stop-face or camface 412' of the main valve-stop 412. As the bucket descends the valve-actuator tends to close the valve, and the stop-face 412' rides over the stop 44 of the limiter 42.

It will be observed that the stop-face or cam-face 412' of the valve-stop 412 is shown as being of relatively greater valve-closing retarding efficiency than the stop-face or cam-face 412'', by reason of which the closing movement of the valve is somewhat retarded during the first period of the flow of the supply-stream into the bucket, and this retarding action continues until the load is nearly completed. On the riding up of the stop 44 on the cam-face 412'' of the valve-stop 412 the valve will be permitted, through the valve-closing actuator, (the bucket in the interim having descended somewhat,) to have a relatively-accelerated closing movement, which tends to materially reduce the volume of the supply-stream for bringing said stream to a drip. At this period it will be assumed that the stop-face is in contact with the stop-face 412'', and near the end thereof. At about this period the detent 569 will be in engagement with the by-pass stop 570, which prevents the valve closing momentarily or until the drip-stream has completed the load. On the farther descent of the bucket the by-pass stop 570 will be carried out of engagement with the detent 569. The engagement of these stops will be merely momentary, it being of sufficient duration to permit the flow of the drip-stream into the bucket for completing the load therein. On the disengagement of the detent 569 and the by-pass stop 570 the valve will be permitted to close quickly, and the arm or detent 569 will engage the cranked or curved portion 45 of the limiter and will oscillate the same on its pivot, synchronously therewith, disengaging the detents 41 and 40, and the stop 44 will be quickly forced into locked engagement with the locking-stop 413 of the valve-stop 412. On the disengagement of the detents 41 and 40 the bucket will be free of all restraint and can then oscillate for discharging the load. The locked engagement of the stops 44 and 413 will be maintained during the discharge of the bucket-load, and these stops will be in locked engagement until disengaged by a thrust imparted to the valve by the valve-opening actuator.

A second limiter, constituting a supplemental limiter, is also employed for limiting the discharge movement of the bucket by the non-closing of the valve. Such a limiter is shown at 50 and as suitably secured to the bucket by riveting or other fastening means. This supplemental limiter is oscillatory with the bucket and is shown as having two stop or limiting faces. One of said stop-faces is shown at 51 as defined by an arc drawn from the center of movement of the oscillating bucket. A second stop-face is shown at 52 and is shown as a cam-face. The valve 70 is shown provided with a stop-arm 75 in the form of a friction-wheel, which is adapted for alternately coöperating with the stop-faces 51 and 52. As stated, the supplemental limiter 50 is oscillatory with the bucket. During the descent of the bucket and the closure of the valve the stop 75, carried by the valve, will ride along the cam-face 52 of said supplemental limiter. The two faces 51 and 52 are shown as merging at a common point which forms a wedge. While the valve is closing the stop-arm 75 thereof will be in engagement with the stop 52 of the supplemental limiting-stop 50. At a period immediately following the cut off of the supply-stream the stop-arm 75 of the valve will by reason of the closing of the valve be carried past the stop-face 52 of said supplemental limiter. At about this time the bucket will oscillate for discharging the load, and the stop-face 51 of the supplemental limiter on the oscillation of the bucket will be carried into operative relation with the stop-arm 75, thereby preventing opening movement of the valve. The supplemental limiter serves as an effective means for guarding against premature operation of either the valve or the bucket and acts as an important adjunct to the principal limiter 42.

The bucket G is shown provided with a closer 83, which is illustrated as pivoted at 86 to said bucket and is of a size to cover the discharge-opening of the bucket, and is adapted to prevent escape of the material during the descent of the bucket. The bucket is also shown provided with a suitable counterweight, such as 86', for returning the bucket to its normal stream-receiving position on the discharge of the load.

It will be evident from the preceding description that in connection with a bucket mechanism embodying a bucket oscillatory for discharging the bucket-load, and with means for supplying a stream of material to the bucket and a valve for controlling said stream, two stops are employed, operative, respectively, one for limiting the oscillation of the bucket by the non-closing of the valve and the other for limiting the opening movement of the valve by the non-oscillation of the bucket.

Briefly described, the operation of a weighing-machine embodying the present improvements is as follows:

In Fig. 1 the bucket is shown in a position for receiving the full supply-stream, the valve 70 being open. When the major portion of a load of the material has been received in the bucket, the bucket will begin to descend, thereby permitting a closure of the valve in the manner hereinbefore described.

In Fig. 2 the valve is shown as having reduced the size of the supply-stream to a drip-stream. At this period in the operation of the machine the detent 569 will, by the power of the closing-valve, be carried into engagement with the stop 570 on the hanger. As hereinbefore stated, this engagement is momentary, it being merely just of sufficient duration to permit the flow of the reduced or drip stream which is necessary to complete the load in the partially-loaded bucket. On the farther descent of the bucket the stop 570 will be carried by the hanger 16 out of engagement with the detent 569, at which time the valve-closing actuator will be rendered effective for quickly closing the valve. When the arm 569 has passed beyond the stop 570, it will be carried into engagement with the cranked or curved portion 45 of the latch or limiter, which action oscillates the latch or limiter on its pivot, throwing the locking-stop 44 into locked engagement with the locking-stop 413 of the main valve-stop 412. Immediately on the engagement of the cranked portion 45 of the latch or limiter 42 this action disengages the detents 41 and 40, which permits an oscillation of the bucket for discharging the load therein.

While the bucket is in its lowermost or load-discharging position, as shown in Fig. 3, and during the discharge of the bucket, the locking-stops 44 and 413 will be in locked engagement and the valve-opening actuator will be in the position shown in Fig. 3. During the discharge of the load the beam mechanism tends to raise the bucket vertically, and a counterweight, such as 86', will be employed for effecting a return oscillation of the bucket for bringing this to a position for receiving the stream. On the return oscillation of the scale-beam B the supplemental beam or valve-opening actuator 551, when the beam has nearly assumed a horizontal position and when the bucket has nearly reached its uppermost position, will be given a relatively rapid thrust through the medium of the connecting-rod 558, which tends to open the valve and shift the limiter for permitting an opening movement of the valve. At this time the detents 40 and 41 will be nearly opposite each other. A counterweight 42' of relatively small power will be employed for shifting said limiter-detent 41 into operative relation with the detent 40 on the bucket.

The diagrammatic view, Fig. 9, illustrates the peculiar action of the bucket and the valves during the descending and bucket-discharge movements, the dotted lines $a\ b\ c\ d$ indicating the several positions assumed by the bucket during its descent and oscillation. It will be noticed that the limit of the descending movement is very slight as compared with other machines of this type. Dotted lines in said diagrammatic illustration also show the peculiar movements of the stop-arm 75 of the valve and the coacting bucket-limiter 50, showing the successive positions of the valve and the bucket during their operation. The stop-face 52 will permit a perfectly free closing movement of the valve during the ascent of the bucket; but it forms an effective adjunct for limiting the accidental oscillation of the bucket at any period prior to the completion of the bucket-load. The stop-face 51 of said stop 50, when the bucket is in a position for oscillation for discharging the load, will be in contact with the stop-arm 75, carried by the valve, said stop-arm 75 having passed beyond the stop-face 52 and onto the stop-face 51 by the closure of the valve; but said stop-arm will offer no resistance to a prompt oscillation of the bucket. During the return oscillation and ascent of the bucket the curved stop-face 51 serves as a means for reducing the shock which necessarily follows the return movement of the bucket.

Having thus described my invention, I claim—

1. In a weighing-machine, the combination with a bucket mechanism embodying a bucket oscillatory for discharging the bucket-load; of means for supplying a stream of material to the bucket; a stream-controlling valve for said chute; valve-actuating mechanism; and a reciprocally-effective valve and bucket movement limiter operative for limiting the oscillation of the bucket by the non-closing of the valve, and for limiting the opening movement of the valve by the non-oscillation of the bucket.

2. In a weighing-machine, the combination with a bucket mechanism embodying a bucket oscillatory for discharging the bucket-load, of means for supplying a stream of material to the bucket; a valve for controlling said stream; valve-actuating mechanism; and an oscillatory and reciprocally-effective valve and bucket movement limiter operative for limiting the oscillation of the bucket by the non-closing of the valve, and for limiting the opening movement of the valve by the non-oscillation of the bucket.

3. In a weighing-machine, the combination with a bucket mechanism embodying a bucket oscillatory for discharging the load, and having also a return oscillation; means for supplying a stream of material to the bucket; a valve for controlling said stream of material; valve-actuating mechanism; and a reciprocally-effective valve and bucket movement limiter having two positions, and operative in one position for limiting the closing movement of the valve, and in the other position for limiting the return oscillation of the bucket.

4. In a weighing-machine, the combination with a bucket mechanism, embodying a bucket oscillatory for discharging the load; of means for supplying a stream of material to the bucket; a valve in position and adapted for controlling the supply-stream; means for actuating the valve to open and close the same; a limiter in position and adapted for limiting the closing movement of the valve by the non-oscillation of the bucket; and an actuator operated by the power of the closing-valve for actuating said limiter for throwing it out of operative relation with the bucket, to thereby permit the oscillation of said bucket for discharging the load and into locked engagement with the valve, thereby preventing the opening movement of the valve during the bucket-discharging period, substantially as specified.

5. In a weighing-machine, the combination with a bucket mechanism embodying a bucket oscillatory for discharging the load; of means for supplying a stream of material to the bucket; a valve in position and adapted for controlling the supply-stream; a stop carried by the valve and having a limiting-face and a locking-stop; means for actuating the valve to open and close the same; and a reciprocally-effective valve and bucket movement limiter in position and adapted for coöperating with the limiting-face of the valve-stop to thereby limit the closing movement of the valve by the non-oscillation of the bucket; and an actuator operated by the power of the closing-valve for throwing the limiter out of operative relation with the bucket to thereby permit an oscillation of said bucket, and into locked engagement with the locking-stop of the valve-stop to thereby prevent opening movement of the valve during the bucket-discharging period, substantially as specified.

6. In a weighing-machine, the combination with bucket mechanism embodying a bucket oscillatory for discharging the bucket-load; of a supply-chute; a stream-controlling valve for said chute; and a pair of stops operative, respectively, one for limiting the oscillation of the bucket by the non-closing of the valve, and the other for limiting the opening movement of the valve by the non-oscillation of the bucket, substantially as specified.

7. In a weighing-machine, the combination with a bucket mechanism embodying a bucket oscillatory for discharging the load; a pair of bucket-carrying hangers; and beam mechanism for carrying said hangers; of means for supplying a stream of material to the bucket; a valve in position and adapted for controlling the supply-stream; means for actuating the valve to open and close the same; and a reciprocally-effective valve and bucket movement limiter carried by one of said hangers, and adapted, respectively, for limiting the closing movement of the valve by the non-oscillation of the bucket, and the opening movement of the valve during the bucket-discharging period, substantially as specified.

8. In a weighing-machine, the combination with bucket mechanism embodying a bucket oscillatory for discharging the bucket-load; of a supply-chute; a stream-controlling valve for said chute, said valve having a locking-stop; and a reciprocally-effective valve and bucket movement limiter supported for movement independently of the valve and bucket movements, said limiter having a locking-stop for engaging the locking-stop carried by the valve on the oscillation of the bucket to thereby lock the valve against opening movement during the bucket-discharging period, substantially as specified.

9. In a weighing-machine, the combination with a bucket mechanism oscillatory for discharging the load; of means for supplying a stream of material to the bucket; a valve in position and adapted for controlling the supply-stream; means for actuating the valve to open and close the same; an oscillatory limiter for limiting the valve-closing movement; a detent carried by the bucket and in position and adapted to engage said limiter during the valve-closing movement to hold said limiter against oscillation; and an actuator operated by the power of the closing-valve for releasing the limiter from engagement with the stop carried by the bucket, to thereby permit an oscillation of the bucket, substantially as specified.

10. In a weighing-machine, the combination with a bucket mechanism embodying a bucket oscillatory for discharging the load; of means for supplying a stream of material to the bucket; a valve for controlling the supply-stream; means for actuating the valve to open and close the same; a main stop carried by the valve and oscillatory therewith, and having a pair of stop-faces and a locking-face; a limiter having a locking-stop in position and adapted for engagement with the stop-faces of the main stop; and an actuator carried by the valve and adapted for actuating the limiter for throwing the locking-stop thereof into locked engagement with the locking-stop of the main stop, thereby locking the valve against opening movement during the bucket-discharging period, substantially as specified.

11. In a weighing-machine, the combination with a bucket mechanism embodying a bucket oscillatory for discharging the bucket-load; of a supply-chute; a stream-controlling valve for said chute, said valve having a stop; and a bucket-movement limiter having a longitudinal stop-face for coacting with said valve-stop to thereby prevent oscillation of the bucket, substantially as specified.

12. In a weighing-machine, the combination with a bucket mechanism embodying a bucket oscillatory for discharging the load; of means for supplying a stream of material to the bucket; a valve for controlling the supply-stream; means for actuating the valve to open and close the same; a stop-arm carried by the valve; and a limiter carried by the bucket, and having two stop-faces, and having one of said stop-faces adapted to coöperate with the stop-arm on the valve for preventing the discharge movement of the bucket during the closing of the valve, and having the other stop-face in position and adapted for permitting the discharge oscillation of the bucket on the closure of the valve, substantially as specified.

FRANCIS H. RICHARDS.

Witnesses:
FRED. J. DOLE,
F. N. CHASE.